United States Patent
Finger-Albert

(10) Patent No.: US 12,308,720 B2
(45) Date of Patent: May 20, 2025

(54) WEDGE ELEMENT FOR AN ELECTRIC EXCITED ROTOR

(71) Applicant: Valeo eAutomotive Germany GmbH, Erlangen (DE)

(72) Inventor: Christian Finger-Albert, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 271 days.

(21) Appl. No.: 18/146,047

(22) Filed: Dec. 23, 2022

(65) Prior Publication Data

US 2023/0208236 A1  Jun. 29, 2023

(30) Foreign Application Priority Data

Dec. 23, 2021 (EP) .................................. 21217514

(51) Int. Cl.
*H02K 3/34* (2006.01)
*H02K 1/26* (2006.01)

(52) U.S. Cl.
CPC ............... *H02K 3/345* (2013.01); *H02K 1/26* (2013.01)

(58) Field of Classification Search
CPC .................. H02K 1/26; H02K 3/345

USPC .......................................................... 310/179
See application file for complete search history.

(56) References Cited

U.S. PATENT DOCUMENTS

| | | | | |
|---|---|---|---|---|
| 4,400,639 A | * | 8/1983 | Kobayashi ............... | H02K 3/38 310/214 |
| 2015/0076935 A1 | * | 3/2015 | Bulatow ................. | H02K 3/487 310/214 |
| 2017/0353092 A1 | * | 12/2017 | Park ......................... | H02K 1/24 |
| 2020/0177046 A1 | * | 6/2020 | Finger-Albert .......... | H02K 3/51 |
| 2024/0204600 A1 | * | 6/2024 | Grauvogl ............... | H02K 3/527 |
| 2024/0204633 A1 | * | 6/2024 | Franke ................... | H02K 3/345 |

* cited by examiner

*Primary Examiner* — Rashad H Johnson
(74) *Attorney, Agent, or Firm* — Oblon, McClelland, Maier & Neustadt, L.L.P.

(57) ABSTRACT

A rotor including a rotor shaft, a rotor body formed of a stack of laminations having a plurality of teeth projecting radially, a field coil wound around each tooth of the plurality of teeth, and a plurality of wedge elements each having two lateral sides configured to come against respectively a corresponding tooth. A convex portion and a projecting portion adjoining the convex portion are arranged on each one of the two lateral sides of the corresponding wedge element, the convex portion complementing a corresponding concave portion of the corresponding tooth, and the projecting portion coming against a corresponding protruding portion of the corresponding tooth. The projecting portion is configured to exert a pressing force on the protruding portion such that to press the convex portion against the concave portion.

20 Claims, 4 Drawing Sheets

WEDGE ELEMENT FOR AN ELECTRIC EXCITED ROTOR

FIELD OF THE INVENTION

The present invention belongs to the field of rotary electric machines configured to be on board of an automotive vehicle, such as an electric vehicle (EV) or a hybrid vehicle (HV).

The present invention relates in particular to the field of electric excited rotors, also called wound rotors or slip ring rotors, integrated to rotary electric machines.

BACKGROUND OF THE INVENTION

As is known, an electric or a hybrid automotive vehicle presents an electric drive comprising a rotary electric machine which need to be supplied with electric power, for instance by a high voltage power supply battery, to deliver a mechanical power in order to ensure the propulsion of the vehicle.

In a general manner, the rotary electric machine comprises a stator, referring to a fixed part of the rotary electric machine, and a rotor, referring to a rotating part of the rotary electric machine. The rotor then comprises a rotor shaft configured to ensure the transmission of the mechanical power between the rotary electric machine and an exterior driven apparatus, notably the wheels of the vehicle.

In particular, it is known to have the rotor electric excited. This type of rotors is commonly referred as wound rotors or slip ring rotors. Such a rotor comprises a rotor body formed of a stack of laminations having a plurality of teeth projecting radially, and a field coil wound around the plurality of teeth. Then, the field coil is connected to an external power supply through slip rings. The slip rings correspond to electro-mechanical devices configured to allow the exchange of electric power between the field coil, which rotates with the rotor, and the external power supply, which is fixed.

However, in the context of the rotary electric machine for the electric or hybrid vehicles, the rotor is designed to rotate at high speeds, which may affect the holding of the field coil due to centrifugal forces. This may weaken the electrical insulation of the field coil, and even lead, in most extreme cases, to short-circuits or to a break of a tooth. A conventional solution to fix the field coil is to mount end caps on both axial ends of the rotor body and impregnate the field coil with resin.

In this context, the main objective of the present invention is to provide a rotor with wedge elements for ensuring the fixation of the field coil, which is easier to produce.

SUMMARY OF THE INVENTION

More specifically, the present invention relates to a rotor for a rotary electric machine, the rotor comprising a rotor shaft configured to rotate around an axis of rotation, a rotor body formed of a stack of laminations having a plurality of teeth projecting radially, and a field coil wound around each tooth of the plurality of teeth. The rotor body is also commonly referred as rotor package. The rotor body is mounted coaxially on the rotor shaft. The rotor further comprises a plurality of wedge elements extending axially and arranged in slots corresponding to space between two adjacent teeth of the plurality of teeth. Each wedge element of the plurality of wedge elements has two lateral sides configured to come against respectively a corresponding tooth of the respective two adjacent teeth.

Then, a convex portion and a projecting portion adjoining the convex portion are arranged on each one of the two lateral sides of the corresponding wedge element. On one hand, the convex portion complements a corresponding concave portion of the corresponding tooth. On another hand, the projecting portion comes against a corresponding protruding portion of the corresponding tooth. The projecting portion is then configured to exert a pressing force on the protruding portion, the pressing force having a force component being opposite to a directly normal direction to a contact surface between the convex portion and the concave portion such that to press the convex portion against the concave portion.

Advantageously, the rotor comprises a potting material which fills the slots.

The present invention provides thus the substantial gain of allowing to ensure a sealing between the wedge elements and the rotor body with respect to the potting material so that to facilitate the injection process of the potting material, notably by limiting potential leaks of the potting material. Moreover, thanks to the complementarity of the convex portion of the wedge element and the concave portion of the corresponding tooth combined with the force applied by the projecting portion, the present invention allows to ensure a mechanically sealed interface with respect to the potting material between the wedge elements and the rotor body even in presence of an irregular and high roughness of the rotor body. The invention allows then to avoid having to use an additional material for the sealing, for instance a rubber sealing or a liquid sealing, which increases the complexity and the related cost for producing the rotor. In a nutshell, the invention provides a solution for the insulation and the mechanical holding of the field coil while facilitating the manufacturing of the rotor.

Advantageously, on each respective lateral side of each wedge element, the convex portion and the corresponding concave portion present a slight overlap, in order to mount the wedge elements between the teeth of the rotor body through a press fitting process. Doing so allows to have an improved sealing between the convex portion and the respective concave portion with respect to the potting material.

According to an exemplary embodiment of the invention, the projecting portion has a flat shape extending over a top surface of the protruding portion of the corresponding tooth.

According to another exemplary embodiment of the invention, the projecting portion has a curved shape with an end of the projecting portion coming substantially normally to the top surface of the protruding portion of the corresponding tooth. Doing so allows to apply a force substantially normal to the top surface of the protruding portion of the corresponding tooth and thus to have an improved mechanical stress distribution for an improved sealing effect between the wedge element and the rotor body with respect to the potting material. Moreover, the curved shape of the projecting portion allows to set up a spring effect which forces the projecting portion onto the protruding portion of the corresponding tooth.

Advantageously, each wedge element of the plurality of wedge elements comprises a first cavity on each one of the two lateral sides of the corresponding tooth, the first cavity being arranged between the convex portion and the projecting portion. The first cavity provides the consequent advantage of adding degrees of freedom to the positioning of the wedge elements, especially by allowing tangential movements of the wedge elements. Thus, the mechanical stress distribution of the wedge elements and of the corresponding teeth is better balanced between the two lateral sides of the corresponding wedge element.

Advantageously, each wedge element of the plurality of wedge elements comprises a flap portion on each one of the two lateral sides of the corresponding tooth, the flap portion facing a bottom surface of the corresponding tooth. Moreover, a second cavity is arranged between the flap portion and the bottom surface of the corresponding tooth. The second cavity adds advantageously radial and tangential degrees of freedom to the possible movements of the wedge element.

Advantageously, each wedge element of the plurality of wedge elements has substantially a triangle cross section with a corner portion of the corresponding wedge element being directed towards the axis of rotation.

Advantageously, in a configuration in which the potting material fills the slots, the corner portion of the corresponding wedge element is configured to ensure a substantially constant thickness of the potting filling material above the field coil.

Advantageously, the plurality of wedge elements has an axial wedge length slightly inferior to an axial length of the rotor body.

Advantageously, the plurality of wedge elements is made out of an insulation material, for instance a plastic material. Thus, the wedge elements electrically insulate the field coil from the rotor body.

Advantageously, the rotor comprises two end caps coming against two axial ends of the rotor body, the two end caps being configured to cover coil ends of the field coil and to be sealed with the rotor body with respect to the potting material.

According to an aspect of the invention, the invention relates to the rotary electric machine comprising the rotor as described previously and a stator.

Another aspect of the invention is the electric drive, comprising the rotary electric machine and an inverter configured to convert a direct current voltage coming from a high-voltage power supply battery into an alternating current voltage so as supply the stator of the rotary electric machine with the AC voltage. The AC voltage may be a multiphase AC voltage, especially a three-phase voltage. The rotor is advantageously supplied with a DC voltage. Preferably, a unique power converter is used for supplying both the AC voltage to the stator and the DC voltage to the rotor.

A further aspect of the invention is an electric of a hybrid vehicle, comprising the electric drive for driving the vehicle. The vehicle may comprise the high-voltage power supply battery, preferably a rechargeable battery for providing the DC voltage to the inverter, if applicable.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

The invention will be better understood on reading the description that follows, and by referring to the appended drawings given as non-limiting examples, in which identical references are given to similar objects and in which.

DETAILED DESCRIPTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 4:
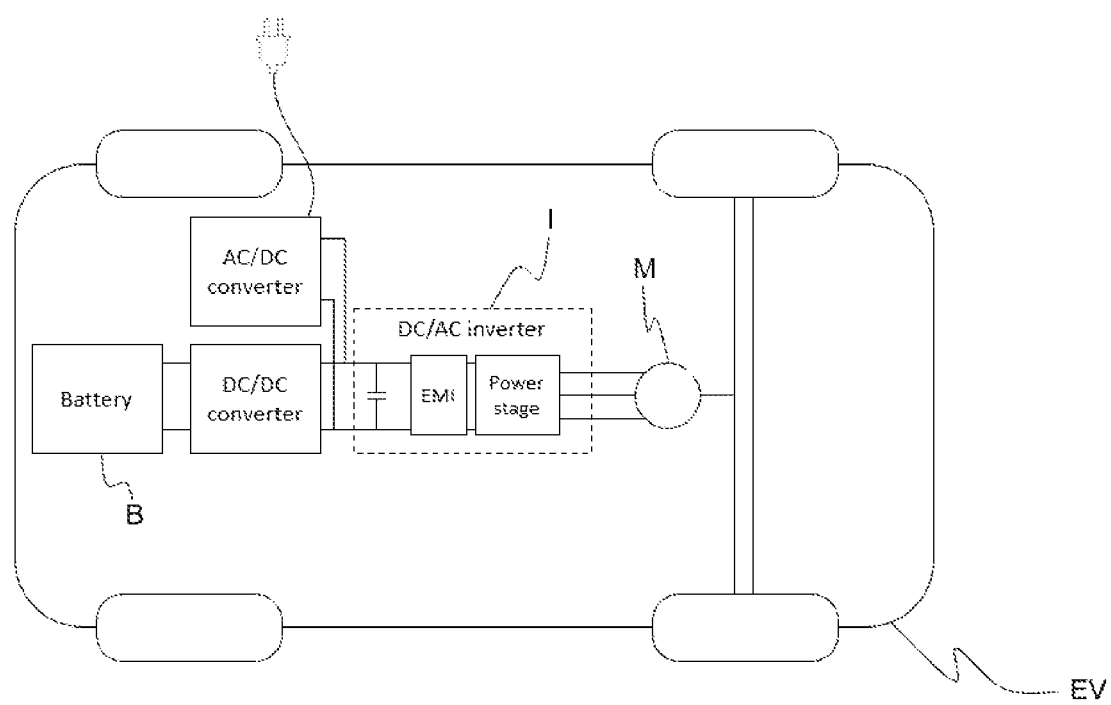
FIG. 4 is a schematic diagram of an automotive electric or hybrid vehicle comprising the rotor of a rotary electric machine according to an embodiment of the invention.

In reference to FIG. 4, an aspect of the invention is an electric vehicle or a hybrid electric automotive vehicle EV comprising wheels and an electric drive configured to drive at least indirectly at least one of the wheels of the vehicle. The vehicle may comprise a high-voltage power supply battery B, preferably a rechargeable battery, for providing electric power to the electric drive. Although, the invention is not limited to this domain.

Another aspect of the invention is the electric drive comprising a rotary electric machine M and an inverter I configured to convert a direct current (DC) voltage coming from the high-voltage power supply battery B into an alternating current (AC) voltage in order to supply the stator of the rotary electric machine M with AC voltage. The rotary electric machine M may in particular be a three-phase rotary electric machine supplied with a three-phase AC voltage. The rotor is advantageously supplied with a DC voltage. Preferably, a unique power converter is used for supplying both the AC voltage to the stator and the DC voltage to the rotor.

The invention also relates to the rotary electric machine comprising a stator, referring to a fixed part of the rotary electric machine, and a rotor, referring to a rotating part of the rotary electric machine. The rotor is, in particular, an electric excited rotor, also commonly referred as a wound rotor or a slip ring rotor. More precisely, the stator presents an annular shape and surrounds coaxially the rotor. Then, the rotary electric machine comprises a casing covering both the stator and the rotor. Ordinarily, the stator comprises a stator body formed of a stack of stator laminations having a plurality of stator teeth projecting radially, and stator windings wound around the stator teeth.

Figure 1:
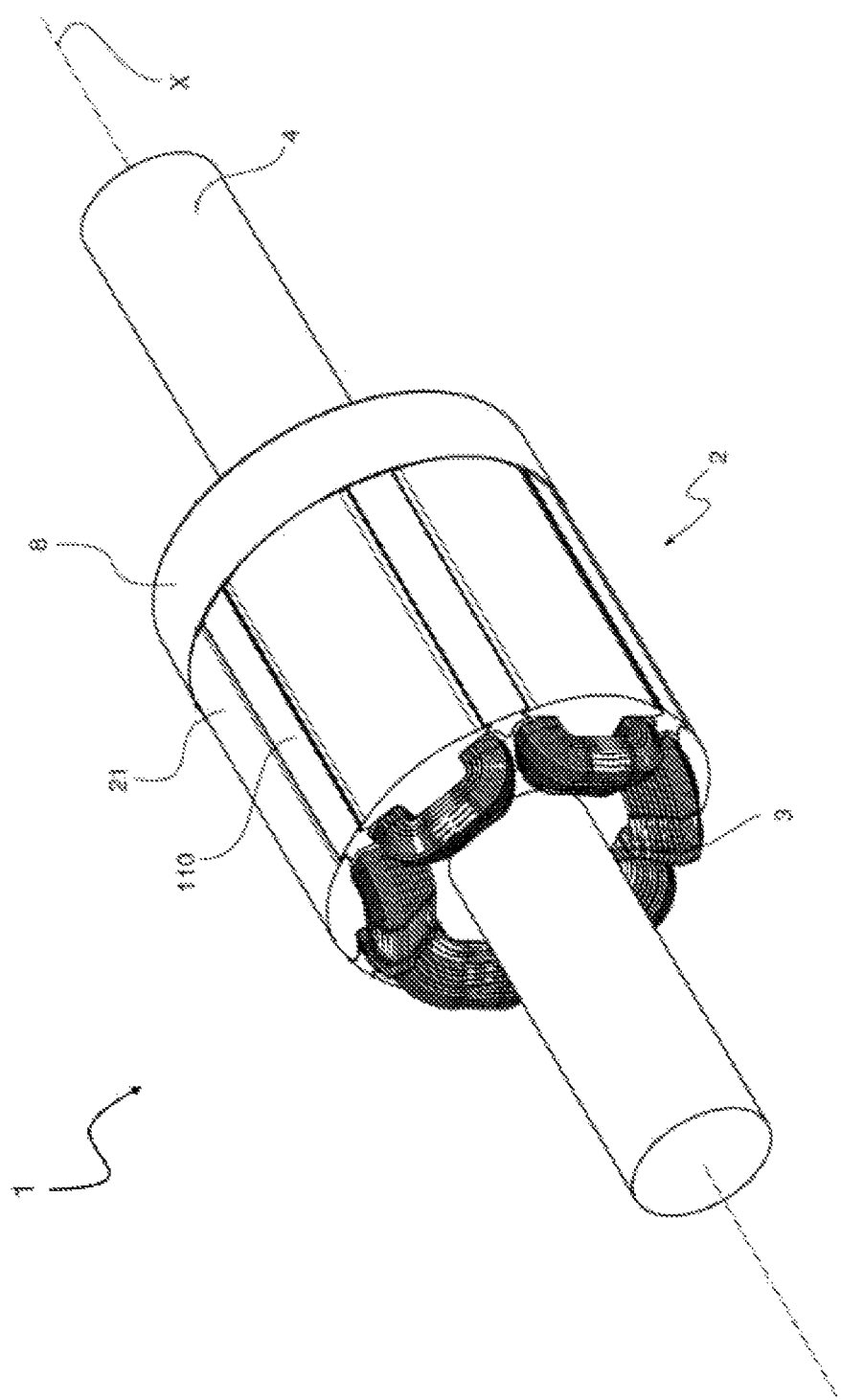
FIG. 1 is a schematic diagram of a view of an example of a rotor according to an embodiment of the invention.

FIG. 1 discloses a partial view of an example of the rotor 1 according to a further aspect of the invention. The rotor 1 comprises a rotor shaft 4 configured to rotate around an axis X of rotation, a rotor body 2 formed of a stack of laminations having a plurality of teeth 21 projecting radially, and at least one field coil 3 wound around each tooth of the plurality of teeth 21. The rotor body is also commonly referred as rotor package. The plurality of teeth 21 may notably comprise four, six, or eight teeth for example. The laminations are especially stacked along the axis of rotation. The rotor body 2 is configured to be mounted coaxially on the rotor shaft 4, for instance the rotor body 2 may be press-fitted on the rotor shaft 4.

The field coil 3 is in particular connected to an external power supply through at least one slip ring (not represented in the drawings) mounted on the rotor shaft 4, namely on an axial end of the rotor shaft 4. The slip rings correspond to electro-mechanical devices configured to allow the exchange of electric power between a rotating element and a fixed element, here respectively the field coil and the external power supply. The rotor 1 may further comprise a holder such that the at least one slip ring is mounted on the rotor shaft 4 through the holder.

Figure 2:
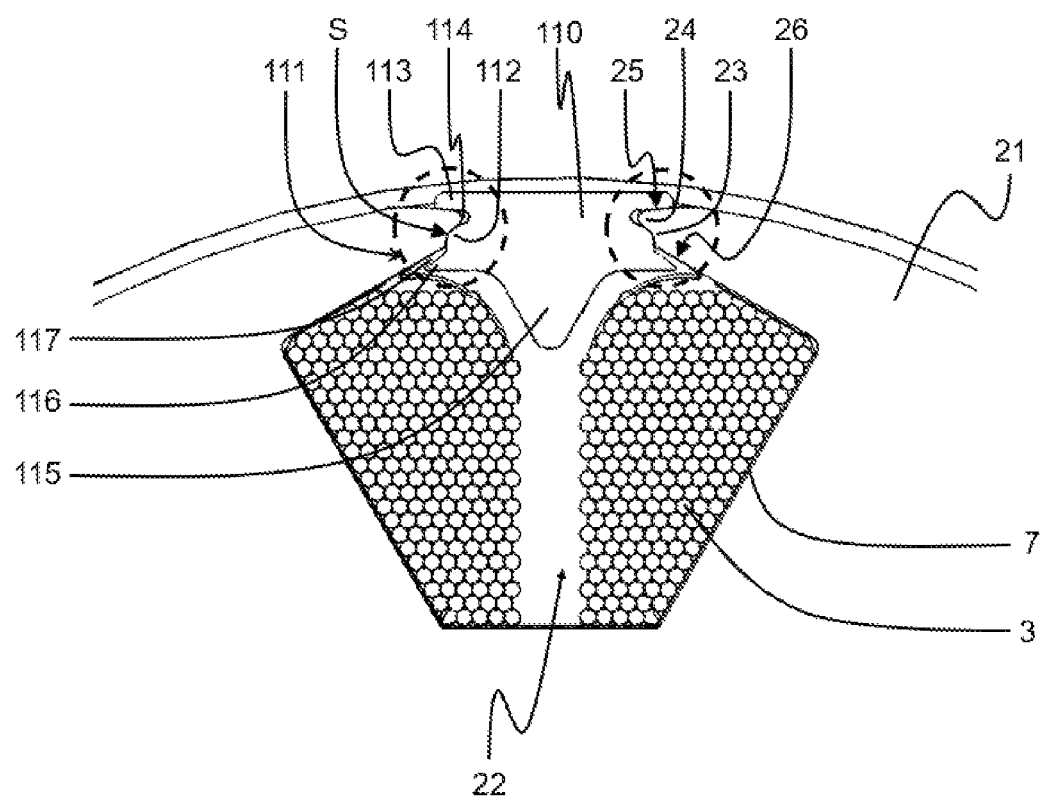
FIG. 2 is a schematic diagram of a partial cut view of an example of the rotor comprising an example of wedge element according to an embodiment of the invention.

FIG. 2 illustrates a partial cut view of an example of the rotor. The field coil 3 notably passes through slots 22 corresponding to space between two adjacent teeth of the plurality of teeth 21, and forms coil ends projecting axially from respectively two axial ends of the rotor body 2. The rotor may also present an insulation system 7 arranged on walls of the slots 22 between the rotor body 2 and the field coil 3 such that to electrically insulate the rotor body 2 from the field coil 3, for instance the insulation system 7 may be an insulation paper.

The rotor 1 may further comprise two end plates (not represented in the drawings), configured to come respectively against the two axial ends of the rotor body 2. The two end plates may present an annular shape, substantially similar to the shape of the two axial ends of the rotor body 2 such that to cover the two axial ends. Then, the field coil 3 advantageously may pass over the two end plates. In other words, the two end plates shall be located between the rotor body 2 and the coil ends of the field coil 3 such that to provide a mechanical holding of the stack of laminations and to electrically insulate axially the field coil 3 from the rotor body 2.

The rotor 1 further comprises a plurality of wedge elements 110 extending axially and arranged in the slots. In other words, each wedge element is placed between the corresponding two adjacent teeth of the plurality of teeth.

Furthermore, as illustrated in FIG. 1, the rotor 1 advantageously comprises two end caps 8 coming against the two axial ends of the rotor body 2, the two end caps 8 being configured to cover the coil ends of the field coil 3. Only one end cap is represented in the FIG. 1 in order to provide an open view on the coil ends of the field coil on one side of the rotor 1.

Then, the slots 22, closed radially by the wedge elements and axially by the two end caps 8, are notably filled with a potting material, for instance a resin, such that to fix the field coil. Advantageously, the wedge elements and the two end caps are configured to be sealed with the rotor body with respect to the potting material such that to ease the injection process of the potting material. In addition, the wedge elements contribute to enhance the mechanical support of the field coil for an improved resistance to centrifugal forces. The two end caps provide in a similar manner the advantage of enhancing the mechanical holding of the rotor body. The field coil 3 is thus prevented from moving due to centrifugal forces during in-service life of the rotor, especially when the rotor rotates at a high speed.

In particular, the two end caps may have bores to enable the injection of the potting material through the bores of one of the two end caps, and to let air out on the bores of another one of the two end caps. An air vacuum system may be arranged on the other one of the two end caps to assist the injection process of the potting material.

Moreover, the wedge elements are notably configured to be mounted on the rotor body after the winding of the field coil around the plurality of teeth and before the injection of the potting material through the slots. More specifically, the wedge elements are inserted axially between adjacent teeth of the plurality of teeth. In particular, the wedge elements are not only used for the injection of the potting material but are kept afterwards for the in-service life of the rotor.

The plurality of wedge elements is advantageously made out of an insulation material, for instance a plastic material. Thus, the wedge elements electrically insulate the field coil from the rotor body. The wedge elements also induce a limited mass increase of the rotor compared for instance to a solution where heads of the teeth are close to one another.

Figure 3:
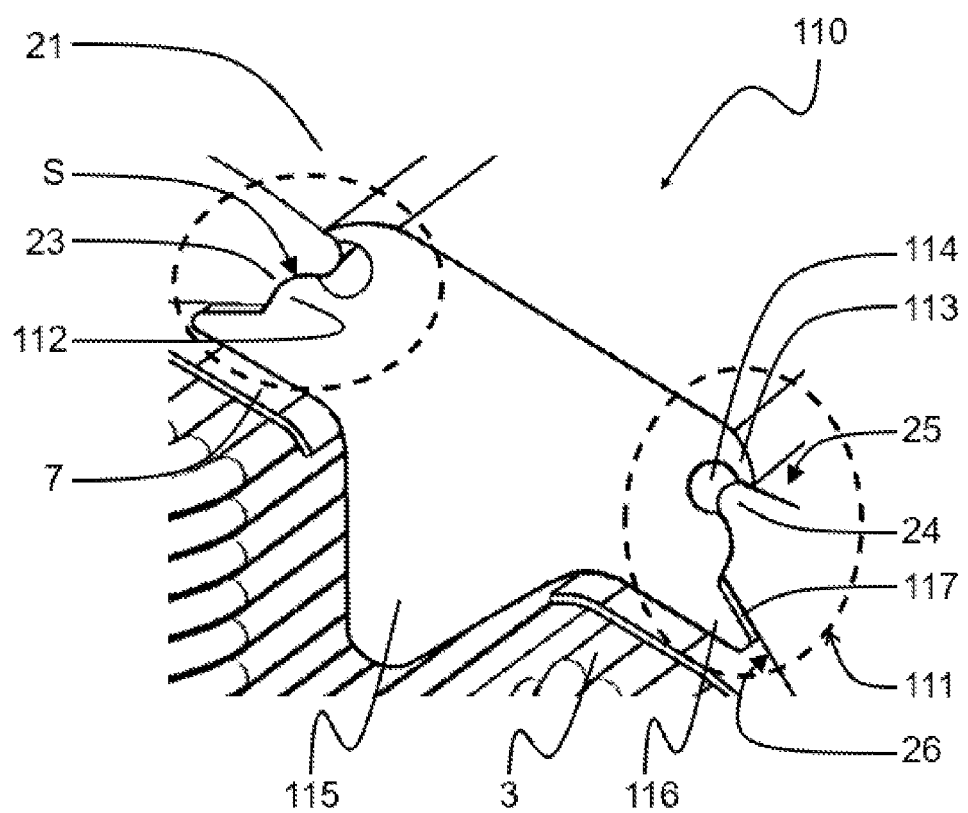
FIG. 3 is a schematic diagram of a partial view of an example of the rotor comprising another example of wedge element according to an embodiment of the invention.

FIGS. 2 and 3 illustrate partial views of two exemplary embodiments of the rotor according to the invention zoomed on a wedge element of the plurality of wedge elements 110. Each wedge element of the plurality of wedge elements 110 has two lateral sides 111 configured to come against respectively a corresponding tooth of the respective two adjacent teeth. The two lateral sides 111 are each respectively circled with a dashed circle in the FIGS. 2 and 3.

Then, a convex portion 112 and a projecting portion 113 adjoining the convex portion 112 are arranged on each one of the two lateral sides 111 of the corresponding wedge element 110. In other words, each wedge element of the plurality of wedge elements 110 comprises the convex portion 112 and the projecting portion 113 on each one of the two lateral sides 111 of the corresponding wedge element.

On one hand, the convex portion 112 complements a corresponding concave portion 23 of the corresponding tooth. On another hand, the projecting portion 113 comes against a corresponding protruding portion 24 of the corresponding tooth. In particular, the projecting portion 113 has a tongue shape projecting from the wedge element onto the protruding portion 24 of the corresponding tooth. Then, the projecting portion 113 is configured to exert a pressing force on the protruding portion 24, the pressing force having a force component being opposite to a directly normal direction to a contact surface S between the convex portion 112 and the concave portion 23 such that to press the convex portion 112 against the concave portion 23. That is, the convex portion and the concave portion are forced against one another by the pressing force applied by the projecting portion 113 on the protruding portion 24.

The present invention provides thus the substantial gain of allowing to ensure a sealing between the wedge elements and the rotor body with respect to the potting material so that to facilitate the injection process of the potting material, notably by limiting potential leaks of the potting material. Moreover, it can be noted that the lamination package has a specific roughness pattern on its outer circumference, that complexifies yet the sealing between the wedge elements and the lamination package with respect to the potting material. The roughness of the lamination package is known to be high and irregular. Thanks to the complementarity of the convex portion of the wedge element and the concave portion of the corresponding tooth combined with the force applied by the projecting portion, the present invention allows to ensure a mechanically sealed interface between the wedge elements and the rotor body with respect to the potting material even in presence of an irregular roughness of the rotor body.

Moreover, the invention allows to avoid having to use an additional material for the sealing, for instance a rubber sealing or a liquid sealing, which increases the complexity and the related cost for producing the rotor.

In a nutshell, the invention provides a solution for the insulation and the mechanical holding of the field coil while facilitating the manufacturing of the rotor.

On each respective lateral side of each wedge element, the convex portion and the corresponding concave portion may advantageously present a slight overlap, in order to mount the wedge elements between the teeth of the rotor body through a press fitting process. Doing so allows to have an improved sealing between the convex portion and the respective concave portion with respect to the potting material.

The projecting portion may present an internal stiffness such that to further be able to apply a spring force on the protruding portion of the corresponding tooth. This allows to further enhance the force applied on the protruding portion by the projecting portion.

According to an example of the plurality of wedge elements, as illustrated in FIG. 2, the projecting portion 113 has a flat shape extending over a top surface 25 of the protruding portion 24 of the corresponding tooth.

According to another example of the plurality of wedge elements, as represented in FIG. 3, the projecting portion 113 has a curved shape with an end of the projecting portion 113 coming substantially normally to the top surface 25 of the protruding portion 24 of the corresponding tooth. Doing so allows to apply a force substantially normal to the top surface of the protruding portion of the corresponding tooth and thus to have an improved mechanical stress distribution for an improved sealing effect between the wedge element and the rotor body with respect to the potting material. Moreover, the curved shape of the projecting portion allows to set up a spring effect which forces the projecting portion onto the protruding portion of the corresponding tooth.

Furthermore, each wedge element of the plurality of wedge elements 110 may preferably comprise a first cavity 114 on each one of the two lateral sides 111 of the corresponding tooth. The first cavity 114 may be arranged between the convex portion 112 and the projecting portion 113. More precisely, the first cavity 114 is configured to face the protruding portion 24 of the corresponding tooth. In other words, the first cavity 114 is delimited, on the wedge element side, by a portion of the corresponding wedge element between the convex portion 112 and the projecting portion 113, and on the corresponding tooth side, by the protruding portion 24.

The first cavity provides the consequent advantage of adding degrees of freedom to the positioning of the wedge elements, especially by allowing tangential movements of the wedge elements. Thus, the mechanical stress distribution of the wedge elements is better balanced between the two lateral sides of the corresponding wedge element. The mechanical stress distribution on the corresponding two adjacent teeth is consequently also better balanced.

Each wedge element of the plurality of wedge elements 110 may also comprise a flap portion 116 on each one of the two lateral sides 111 of the corresponding tooth. The flap portion 116 allows advantageously to add mechanical strength to the wedge elements. The flap portion 116 may further present a flat surface facing the field coil such that to provide a mechanical support of the field coil beneath the flap portion.

The flap portion 116 especially faces a bottom surface 26 of the corresponding tooth. Then, a second cavity 117 is arranged between the flap portion 116 and the bottom surface 26 of the corresponding tooth. Then, the second cavity 117 adds advantageously radial and tangential degrees of freedom to the possible movements of the wedge element.

In a preferred manner, each wedge element of the plurality of wedge elements 110 has substantially a triangle cross section with a corner portion 115 of the corresponding wedge element being directed towards the axis X of rotation.

Then, the corner portion 115 of the corresponding wedge element is advantageously configured to ensure a substantially constant thickness of the potting material above the field coil 3. Moreover, the triangle cross section allows to ease the injection process of the potting material.

The plurality of wedge elements 110 preferably has an axial wedge length slightly inferior to an axial length of the rotor body 2. As the wedge elements are not to be removed after the injection of the potting material, this difference in length allows to have the wedge elements not over constrained, especially if they are made out of a plastic material.

Although embodiments have been described with reference to a number of illustrative embodiments thereof, it should be understood that numerous other modifications and embodiments can be devised by those skilled in the art that will fall within the spirit and scope of the principles of this disclosure.

The invention claimed is:

1. A rotor for a rotary electric machine, the rotor comprising:
a rotor shaft configured to rotate around an axis of rotation;
a rotor body formed of a stack of laminations having a plurality of teeth projecting radially, the rotor body being mounted coaxially on the rotor shaft;
a field coil wound around each tooth of the plurality of teeth;
a plurality of wedge elements extending axially and arranged in slots corresponding to space between two adjacent teeth of the plurality of teeth, each wedge element of the plurality of wedge elements having two lateral sides configured to come against respectively a corresponding tooth of the respective two adjacent teeth;
wherein a convex portion and a projecting portion adjoining the convex portion are arranged on each one of the two lateral sides of the corresponding wedge element, the convex portion complementing a corresponding concave portion of the corresponding tooth, the projecting portion coming against a corresponding protruding portion of the corresponding tooth, the projecting portion being configured to exert a pressing force on the protruding portion, the pressing force having a force component being opposite to a directly normal direction to a contact surface between the convex portion and the concave portion such that to press the convex portion against the concave portion.

2. The rotor as claimed in claim 1, wherein the projecting portion has a flat shape extending over a top surface of the protruding portion of the corresponding tooth.

3. The rotor as claimed in claim 2, comprising a potting material which fills the slots.

4. The rotor as claimed in claim 2, wherein each wedge element of the plurality of wedge elements comprises a first cavity on each one of the two lateral sides of the corresponding tooth, the first cavity being arranged between the convex portion and the projecting portion.

5. The rotor as claimed in claim 2, wherein each wedge element of the plurality of wedge elements comprises a flap portion on each one of the two lateral sides of the corresponding tooth, the flap portion facing a bottom surface of the corresponding tooth, a second cavity being arranged between the flap portion and the bottom surface of the corresponding tooth.

6. The rotor as claimed in claim 2, wherein each wedge element of the plurality of wedge elements has substantially a triangle cross section with a corner portion of the corresponding wedge element being directed towards the axis of rotation.

7. The rotor as claimed in claim 2, wherein the plurality of wedge elements has an axial wedge length slightly inferior to an axial length of the rotor body.

8. The rotor as claimed in claim 2, wherein the plurality of wedge elements is made out of an insulation material.

9. The rotor as claimed in claim 3, wherein the rotor comprises two end caps coming against two axial ends of the rotor body, the two end caps being configured to cover coil ends of the field coil and to be sealed with the rotor body with respect to the potting material.

10. A rotary electric machine for an electric or a hybrid vehicle, the rotary electric machine comprising the rotor according to claim 2.

11. The rotor as claimed in claim 1, wherein the projecting portion has a curved shape with an end of the projecting portion coming substantially normally to the top surface of the protruding portion of the corresponding tooth.

12. The rotor as claimed in claim 1, comprising a potting material which fills the slots.

13. The rotor as claimed in claim 12, wherein each wedge element of the plurality of wedge elements has substantially a triangle cross section with a corner portion of the corresponding wedge element being directed towards the axis of rotation.

14. The rotor as claimed in claim 12, wherein the rotor comprises two end caps coming against two axial ends of the rotor body, the two end caps being configured to cover coil ends of the field coil and to be sealed with the rotor body with respect to the potting material.

15. The rotor as claimed in claim 1, wherein each wedge element of the plurality of wedge elements comprises a first cavity on each one of the two lateral sides of the corresponding tooth, the first cavity being arranged between the convex portion and the projecting portion.

16. The rotor as claimed in claim 1, wherein each wedge element of the plurality of wedge elements comprises a flap portion on each one of the two lateral sides of the corresponding tooth, the flap portion facing a bottom surface of the corresponding tooth, a second cavity being arranged between the flap portion and the bottom surface of the corresponding tooth.

17. The rotor as claimed in claim 13, wherein the corner portion of the corresponding wedge element is configured to ensure a substantially constant thickness of the potting material above the field coil.

18. The rotor as claimed in claim 1, wherein the plurality of wedge elements has an axial wedge length slightly inferior to an axial length of the rotor body.

19. The rotor as claimed in claim 1, wherein the plurality of wedge elements is made out of an insulation material.

20. A rotary electric machine for an electric or a hybrid vehicle, the rotary electric machine comprising the rotor according to claim 1.

* * * * *